(12) United States Patent
Grimard

(10) Patent No.: US 7,115,209 B2
(45) Date of Patent: *Oct. 3, 2006

(54) METHOD AND INSTALLATION FOR SURFACE MARKING OF A SUBSTRATE

(75) Inventor: Jean-Pierre Grimard, Vif (FR)

(73) Assignee: Becton Dickinson France, S.A.S., Le Pont de Chaix (FR)

( * ) Notice: Subject to any disclaimer, the term of this patent is extended or adjusted under 35 U.S.C. 154(b) by 317 days.

This patent is subject to a terminal disclaimer.

(21) Appl. No.: 10/650,575

(22) Filed: Aug. 28, 2003

(65) Prior Publication Data

US 2004/0035824 A1    Feb. 26, 2004

Related U.S. Application Data

(63) Continuation of application No. 09/857,062, filed on Aug. 2, 2001, now Pat. No. 6,638,440.

(51) Int. Cl.
*B41C 1/22* (2006.01)

(52) U.S. Cl. ............... 216/31; 216/28; 216/52; 216/66; 427/553; 427/554; 427/555; 427/557; 219/121.6; 219/121.68

(58) Field of Classification Search ............ 216/28, 216/31, 52, 66; 219/121.6, 121.68; 427/553, 427/554, 555, 557
See application file for complete search history.

(56) References Cited

U.S. PATENT DOCUMENTS

| 4,299,860 A | * | 11/1981 | Schaefer et al. | 427/556 |
| 4,515,867 A | * | 5/1985 | Bleacher et al. | 428/204 |
| 5,897,719 A | * | 4/1999 | Makita | 148/525 |
| 6,638,440 B1 | * | 10/2003 | Grimard | 216/31 |

* cited by examiner

*Primary Examiner*—Shamim Ahmed
(74) *Attorney, Agent, or Firm*—David M. Fortunato

(57) ABSTRACT

A method for surface marking a solid substrate (1), according to which, during an exposure sequence, said substrate is exposed to coherent monochromatic light (2) in order to strip said substrate over an indented surface (3), wherein the exposure conditions, including duration, are set in order to restrict said indented surface to simple abrasion designed for the bonding of a printing medium, and the exposure sequence is followed by a sequence of projecting in discrete form, during which particles (6) of said printing medium, the deposition of which subsequently defines a printed element (4), are projected in targeted fashion into the indented surface (3, 31).

6 Claims, 2 Drawing Sheets

Figure 4:
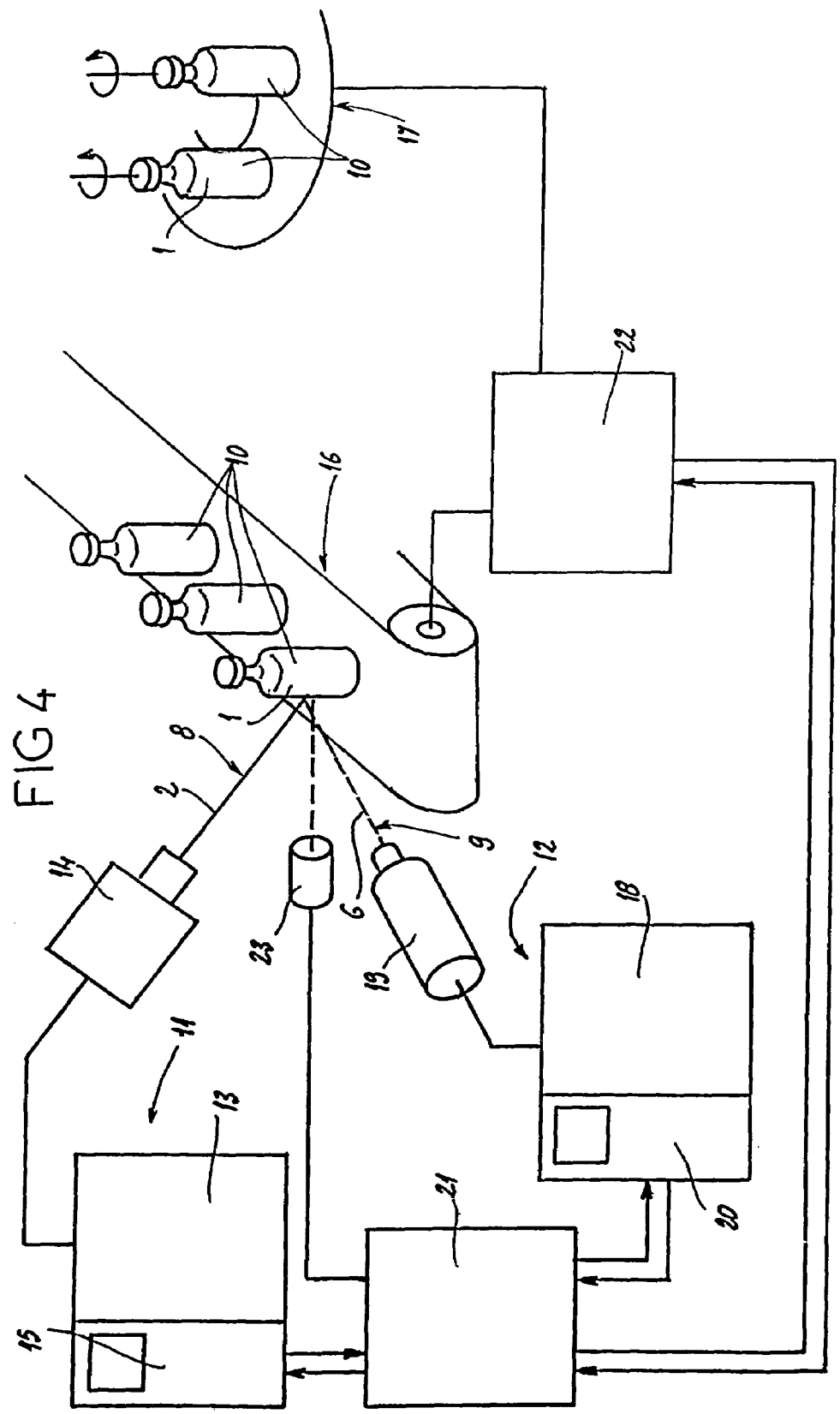

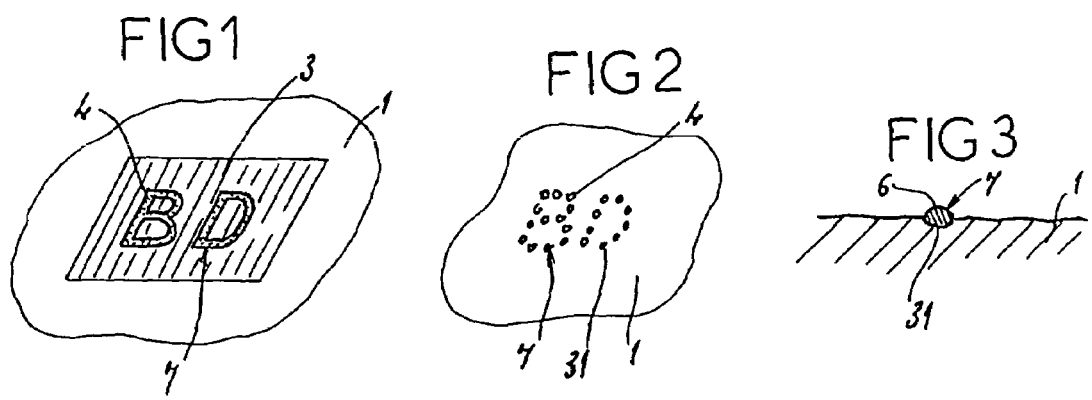
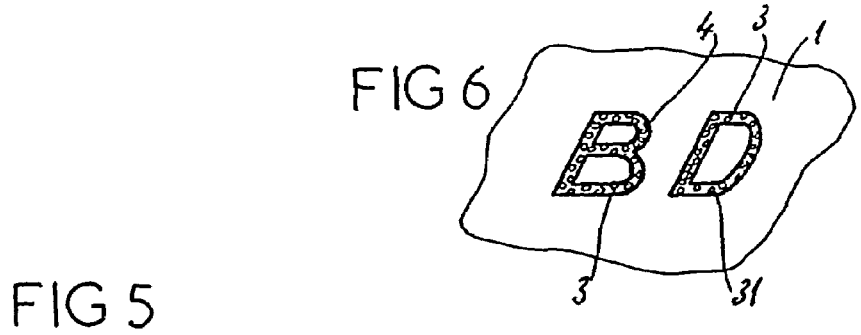
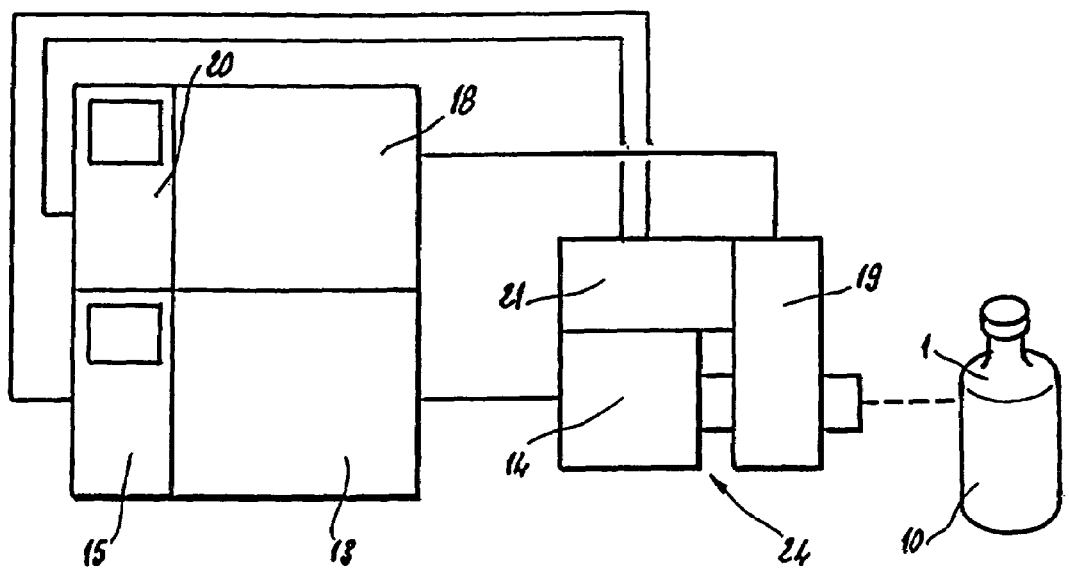

METHOD AND INSTALLATION FOR SURFACE MARKING OF A SUBSTRATE

This application is a continuation of U.S. application Ser. No. 09/857,062 filed on Aug. 2, 2001, U.S. Pat. No. 6,638,440.

The present invention relates to the surface marking of a solid substrate, for example one made of glass.

It is currently still difficult to surface mark glass substrates, for example the outer surface of a container or a bottle, with traditional equipment, for example by flexography or pad printing. Screen printing also needs drying and/or baking operations, requiring complex and expensive equipment. This method is still relatively slow and leads to production costs which are often unacceptable.

There are a variety of factors which in practice make it difficult to obtain durable marking with such means:

the glass surface remains slippery;
the printing ink or inks adhere poorly to the surface, so that any friction is liable to remove the marking at least partially.

It is further known to mark the surface of a solid substrate, for example one made of plastic, by engraving, using a laser instrument for this purpose, that is to say a beam of coherent monochromatic light. Such a printing technique does not necessarily lead to marking which has high contrast and can consequently be read properly with the naked eye. In order to improve contrast, in the case of a plastic, it has been proposed to incorporate reactive particles into its surface. This often leads to degradation of the quality of the plastic.

The present invention relates to a method and to an installation for surface marking a solid substrate, allowing any suitable symbol to be reproduced readably and durably on the surface of said substrate.

The term "surface marking" means a form of marking which modifies or alters the surface of the substrate into the latter but over a very limited thickness, corresponding to simple abrasion.

According to the present invention, a surface marking method successively combines an exposure sequence and a sequence of targeted projecting of printing medium.

During the exposure sequence, the substrate is exposed to coherent monochromatic light, or laser light, in order to strip the substrate over a continuous or discontinuous indented surface, under conditions, including duration, such that the indented surface is restricted to simple abrasion, designed and sufficient to contain and bond the printing material which will be discussed below. This means that the conditions or parameters of the exposure are chosen, as regards their respective values, in a way which is sufficient to strip the surface of the substrate but without eroding it to the extent of obtaining a permanent engraving. In the context of the present invention, the exposure does not make it possible to obtain engraving which is on its own sufficient for permanent marking of the substrate.

Next, during the sequence of targeted projecting in discrete form, particles of the printing medium, the deposition of which subsequently defines a printed element, are projected into the indented surface obtained after the exposure sequence.

As regards the projecting sequence, there are two different embodiments to consider:

the projecting sequence is carried out in liquid form, by virtue of which the particles are droplets in liquid form, the deposition of which defines a printed element, in particular after fusion and setting, or drying;

the projecting sequence is carried out in solid form, as a powder, by virtue of which the particles are grains, in solid form or as a powder, the deposition of which defines a printed element, after adhesion to the substrate.

Preferably, according to traditional printing techniques employing a frame, the symbol to be marked or reproduced is predetermined by the juxtaposition or combination of points, having identical or different elementary areas. According to the present invention, each point corresponds to one element printed using the method defined above, having identical or different elementary areas.

Accordingly, a surface marking installation according to the invention consists of the interaction of the following means, namely:

an instrument for exposing the substrate to coherent monochromatic light, comprising a source of said light, a head for projecting a beam of said light, and a component for controlling said beam, in particular its modulation and/or its orientation in space;

an instrument for projecting in discrete form targeted onto the substrate, comprising a source of the aforementioned printing medium, a head for projecting a jet of particles of the printing medium, and a component for controlling said jet, in particular its orientation in space and/or the size of said particles;

means for moving the substrate relative to the head for projecting the beam and the head for projecting the jet, or vice versa;

a control means which is connected to the components for controlling the beam and the jet and is designed to obtain on the substrate as a function of its position relative to the heads for projecting the beam and for projecting the jet respectively, simple abrasion designed for bonding of the printing medium then deposition of the latter, targeted into the indented surface, successively at the same point having elementary area, all the points coated with the printing medium, or printed points, in combination representing a symbol with which the substrate is thus marked.

The present invention has the decisive advantage of decontaminating the surface layer of the substrate, by virtue of the use of the laser beam, which makes it possible to obtain a perfectly clean and decontaminated indented surface before printing. Such an advantage is significant in industries such as the pharmaceutical industry, in which there is always a desire for supports having a maximum decontamination level.

According to FIGS. 1 to 3 described below, three embodiments of the invention may be employed:

according to FIG. 1, the indented surface 3 of the substrate 1 is matched to or larger than the area circumscribing the symbol 4 to be reproduced or printed; the indented surface is then coated, point by point, with particles 6 of the printing medium in order to obtain, as represented in FIG. 1, printed points whose combination represents the symbol 4;

according to FIGS. 2 and 3, the symbol to be reproduced is defined by the juxtaposition of printed points 7 which have equal elementary area and are assembled in a predetermined pattern corresponding to the symbol 4; during the exposure sequence, the substrate 1 is moved relative to the beam of coherent monochromatic light, or conversely by deviating the beam; this beam, obtained for example with a so-called dot matrix $CO_2$ laser, is pulsed, in order to define a plurality or multiplicity of indented points 31, the combination of which represents the symbol 4; then, by moving the substrate 1 relative to the jet of particles of the printing medium, or conversely by deviating the jet, only the indented points 31 are coated with the particles 6 of the printing medium in order finally to obtain, as represented in FIG. 2, printed points 7 whose combination represents the symbol 4;

according to FIG. 6, the indented surface 3 obtained at the end of the exposure sequence is identical to and reproduces the symbol to be reproduced, while being limited by one or more continuous and/or discontinuous lines; then during the projecting sequence, the indented surface is coated, point by point, with the particles 6 of the printing medium in order finally to obtain, as represented in FIG. 2, printed points 7 throughout the indented surface 3.

The elementary 31 and overall 3 indented surfaces which are represented in FIGS. 1 and 6 can be obtained in several ways, namely:

with a relatively wide-section laser beam which passes through a mask and whose energy density is tailored to the marking dimensions; for example, a TEA (Transverse Excited Atmospheric Pressure) pulsed $CO_2$ laser seems well-suited for such a method;

with a laser beam deflected and driven by computer along two perpendicular axes; for example, a CW (Continuous Wave) laser seems well-suited for such a method;

these two methods may themselves be employed, where appropriate, according to a so-called dot matrix technique, for example with a $CO_2$ laser.

The present invention will now be described with reference to the appended drawing, in which:

FIG. 1 gives a perspective representation of the surface of a solid substrate, including an abraded indented surface on which a defined symbol has been reproduced, this being according to a first embodiment of the invention;

FIG. 2 represents a second embodiment of the invention, under the same conditions as those in the representation of FIG. 1;

FIG. 3 gives a schematic cross-sectional representation of the substrate which is represented in FIG. 2 and is permanently marked according to the present invention;

FIG. 4 schematically represents a marking installation according to the invention and in a first embodiment;

FIG. 5 represents a marking installation according to a second embodiment of the invention;

and FIG. 6 represents a third embodiment of the invention, under the same conditions as those in the representation of FIG. 1.

According to FIG. 4, by way of example, a marking installation according to the invention comprises:

an instrument 11 such as a laser for exposing a substrate 1, which will be discussed below, to coherent monochromatic light 2; this instrument conventionally comprises a source 13 of said light, a head 14 for collimated projection of this light as a beam 8, and a component 15 for controlling, in particular modulating, the beam 8;

an instrument 12 for projecting in discrete and targeted form onto the substrate 1, for example of the inkjet printing type, comprising a source of the printing medium in liquid form, for example an ink, a head 19 for projecting a jet 9 of droplets 6 of the printing medium in liquid form, and a component 20 for controlling the jet;

means for moving the substrate 1 relative both to the head 14 for projecting the beam and to the head 19 for projecting the jet, or vice versa; these means may consist either of a conveyor 16 carrying the objects 10 to be marked (glass bottles or glass syringes, for example), or a turntable 17 supporting the same objects, for example with components for rotating the objects 10 and therefore the substrate 1;

a control means 21, in particular a sequencing means, which is connected to the components 15 and 20 for controlling the beam 8 and the jet 9 respectively; this control means 21 is designed, in analogic or digital form, to obtain on the substrate 1, as a function of its position relative to the heads 14 and 19, and as a function of the predetermined pattern or symbol to be reproduced, limited stripping with the light beam 8, allowing the printing medium to bond, then targeted deposition, with the jet 9 of the printing medium in liquid form, in the indented surface 3 or 31 obtained by stripping, successively at the same point 7 having elementary area.

At a given point 7 having elementary area, the stripping may be either at a point (for example with a dot matrix laser), or contained in a larger surface, itself previously stripped as described above with reference to FIGS. 1 and 6.

As shown by FIGS. 1, or 2 and 3, or 6, all the points 7 coated with the printed material, or printed points, in combination together represent the symbol 4, with which the surface 1 is thus marked.

As represented in FIGS. 4 and 5, the heads 14 and 19 for respectively projecting the beam 8 and projecting the jet 9 are fixed, and the control means 21 includes a sensor 23 detecting the position of the object 10 to be marked, and possibly the orientation of the latter and therefore of the substrate 1, in order to sequence the exposure then the liquid projecting at the same point, as a function of the predetermined pattern or symbol to be reproduced.

The embodiment represented in FIG. 5 differs from the one described above only by the fact that the heads 14 and 19 for projecting the beam 8 and for projecting the jet 9 are joined in a single component 24.

A drive component 22, either for the conveyor 16 or for the turntable 17, is subordinated to the means 21 in terms of control, or vice versa. The control means 21 supervises the deviation of the light beam 8 and of the jet 9, subject to the position of the object 10 and therefore of the substrate 1, and also as a function of the predetermined pattern or symbol to be reproduced.

As described above with reference to FIGS. 1 to 3 and 6, a variety of procedures for exposure (stripping) and projecting (depositing the printing medium) may be employed in order to obtain the same reproduced symbol 4.

By virtue of the installations described above, during operation each point having elementary area which forms part of the surface of the solid substrate 1, and of the predetermined pattern or symbol which is being reproduced, is successively subjected to an exposure sequence, during which the substrate 1 is exposed to coherent monochromatic light in order to strip the substrate over a continuous 3 (FIG. 1 or 6) or discontinuous 31 (FIGS. 2 and 3, or 6) indented surface, and to a sequence of projecting in discrete form, during which particles 6 (droplets or grains) of the printing medium, the deposition of which subsequently defines the symbol 4 to be reproduced, are projected in targeted fashion into the indented surface 3 or 31.

As indicated above, the exposure conditions, including duration, energy density, etc., are defined in order to adapt the indented surface or the indented surfaces to the bonding of the printing medium.

Consequently, each point 7 having elementary surface of the substrate 1 successively receives the beam 8 of monochromatic coherent light and the jet 9 of printing medium. The term "successively" is intended to mean that the projecting sequence takes place immediately after, or sometime after the exposure sequence.

Preferably, but without implying any limitation, the printing medium contained by the droplets 6 is a polymerizable material, and after deposition on the indented surface 3 or 31 the printing medium is polymerized under exposure to ultraviolet light, for example monochromatic and coherent ultraviolet light, for example laser light.

What is claimed is:

1. A method for surface marking a solid substrate (1), according to which, during an exposure sequence, said substrate is exposed to coherent monochromatic light (2) in order to strip said substrate over an indented surface (3), wherein the exposure conditions, including duration, are set in order to restrict said indented surface to simple abrasion designed for the bonding of a printing medium, and the exposure sequence is followed by a sequence of projecting in discrete form during which particles (6) of said printing medium, the deposition of which subsequently defines a printed element (4), are projected in targeted fashion into the indented surface (3, 31), wherein the projecting sequence is carried out in liquid form, by virtue of which the particles (6) are droplets in liquid form, the deposition of which defines a printed element (4), after drying, and wherein the droplets (6) comprise a polymerizable printing medium, and, after the printing medium has been deposited on the indented surface (3, 31), this printing medium is polymerized under exposure to ultraviolet light, for example monochromatic and coherent ultraviolet light.

2. The method as claimed in claim 1, wherein the projecting sequence is carried out in solid form, by virtue of which the particles (6) are grains in solid form, the deposition of which defines a printed element (4), after adhesion to the substrate (1).

3. The method as claimed in claim 1, according to which said symbol is defined by the juxtaposition of printed points (7), having respectively identical or different elementary areas, in a predetermined pattern, wherein a printed element having substantially the same elementary area corresponds to each point (7).

4. The method as claimed in claim 3, wherein, during the exposure sequence, the substrate (1) is moved relative to a beam (8) of said coherent monochromatic light, or vice versa, then during the sequence of projecting in discrete form, and by moving the substrate (1) relative to a jet (9) of the particles of said printing medium, or vice versa, only said indented points (31) are coated with said particles (6) in order to obtain printed points (31) whose combination represents said symbol (4).

5. The method as claimed in claim 4, each point (7) of the substrate (1) which is positioned on the latter in order to mark the symbol (4), is made to receive the monochromatic light beam (8) then the jet (9) of the printing medium.

6. A method for surface marking a solid substrate (1), according to which, during an exposure sequence, said substrate is exposed to coherent monochromatic light (2) in order to strip said substrate over an indented surface (3), wherein the exposure conditions, including duration, are set in order to restrict said indented surface to simple abrasion designed for the bonding of a printing medium, and the exposure sequence is followed by a sequence of projecting in discrete form, during which particles (6) of said printing medium, the deposition of which subsequently defines a printed element (4), are projected in targeted fashion into the indented surface (3, 31), wherein the substrate (1) forms part of an object (10) to be marked, for example a glass bottle or a glass syringe.

* * * * *